US011870897B1

(12) United States Patent
Griffin et al.

(10) Patent No.: US 11,870,897 B1
(45) Date of Patent: *Jan. 9, 2024

(54) POST QUANTUM UNIQUE KEY PER TOKEN SYSTEM

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 17/524,319

(22) Filed: Nov. 11, 2021

Related U.S. Application Data

(63) Continuation of application No. 16/415,473, filed on May 17, 2019, now Pat. No. 11,206,131.

(51) Int. Cl.
| H04L 9/08 | (2006.01) |
| H04L 9/32 | (2006.01) |
| H04L 9/00 | (2022.01) |

(52) U.S. Cl.
CPC .......... *H04L 9/0869* (2013.01); *H04L 9/3247* (2013.01); *H04L 9/50* (2022.05)

(58) Field of Classification Search
CPC ........ H04L 9/0869; H04L 9/3247; H04L 9/50
See application file for complete search history.

(56) References Cited

U.S. PATENT DOCUMENTS

| 8,059,814 | B1* | 11/2011 | Duane .................. H04L 9/3234 380/284 |
| 10,025,941 | B1 | 7/2018 | Griffin et al. |
| 10,341,304 | B1 | 7/2019 | Boutros et al. |
| 10,541,982 | B1 | 1/2020 | Lee et al. |
| 10,762,241 | B1 | 9/2020 | Buckingham et al. |
| 11,206,131 | B1* | 12/2021 | Griffin .................. H04L 9/0869 |
| 2007/0174614 | A1* | 7/2007 | Duane .................. H04L 9/0869 713/168 |
| 2009/0249082 | A1 | 10/2009 | Mattsson |
| 2012/0304273 | A1 | 11/2012 | Bailey et al. |
| 2014/0013452 | A1 | 1/2014 | Aissi et al. |
| 2014/0177825 | A1 | 6/2014 | Mattsson et al. |
| 2015/0180836 | A1* | 6/2015 | Wong .................. G06Q 20/385 713/172 |
| 2016/0028550 | A1 | 1/2016 | Gaddam et al. |
| 2016/0119318 | A1* | 4/2016 | Zollinger ............. H04L 9/3242 713/171 |
| 2017/0163617 | A1* | 6/2017 | Laxminarayanan ........................ G06Q 20/3821 |

(Continued)

*Primary Examiner* — Matthew Smithers
(74) *Attorney, Agent, or Firm* — Foley & Lardner LLP

(57) ABSTRACT

Various arrangements relate to a method performed by a processor of a computing system. An example method includes tokenizing a first value using a tokenization algorithm to generate a first token. The first value and first key are inputs of the tokenization algorithm. A message is generated. The message includes a first value identifier associated with the first value and a first key generation identifier associated with the generation of the first key. The message is associated with the first token. A second key is generated. A second value is tokenized using a tokenization algorithm to generate a second token. The second value and second key are inputs of the tokenization algorithm.

20 Claims, 5 Drawing Sheets

(56) References Cited

U.S. PATENT DOCUMENTS

| | | |
|---|---|---|
| 2017/0195121 A1 | 7/2017 | Frei et al. |
| 2017/0214521 A1 | 7/2017 | Busch |
| 2018/0034802 A1 | 2/2018 | Shelton |
| 2018/0189502 A1 | 7/2018 | Kumar et al. |
| 2018/0189753 A1* | 7/2018 | Konda ................. H04L 9/3236 |
| 2018/0218363 A1 | 8/2018 | Acar et al. |
| 2018/0232728 A1 | 8/2018 | Dooley et al. |
| 2018/0357426 A1 | 12/2018 | Pearson et al. |
| 2020/0021428 A1 | 1/2020 | Balabine et al. |
| 2021/0036856 A1* | 2/2021 | Wang ................. H04L 63/0807 |
| 2021/0176062 A1* | 6/2021 | Chitalia ............... H04L 9/3213 |

\* cited by examiner

POST QUANTUM UNIQUE KEY PER TOKEN SYSTEM

CROSS-REFERENCE TO RELATED APPLICATIONS AND CLAIM OF PRIORITY

This application is a continuation of U.S. application Ser. No. 16/415,473, titled "POST QUANTUM UNIQUE KEY PER TOKEN SYSTEM," filed May 17, 2019, which is hereby incorporated by reference in its entirety.

BACKGROUND

Tokenization is a process in which a token is substituted as a proxy for data, thus obscuring the underlying data. Accordingly, a token is a surrogate value that can be used to replace some underlying sensitive value. For example, a token may be issued as a proxy for a credit or debit card primary account number ("PAN") such that the token is processed during a transaction instead of the actual PAN, thus protecting the PAN from disclosure during the transaction. The tokens may be generated, stored, and maintained by an entity that specializes in the tokenization process. This entity may be a Tokenization Service Provider ("TSP"), as described in the X9.119-2 standard, which would handle receiving requests to tokenize data and detokenize a token to reveal the corresponding data for an authorized party and/or subscriber of the TSP's services. A token can be made to look very similar to the underlying data for which the token is serving as a proxy such that that no reconfiguration of systems is required (i.e., the token is "format preserving"). In the example where the token serves as a proxy for a PAN, the token may have the same format (e.g., a string of sixteen numbers) such that the token can be accepted by existing payment systems. The mapping of underlying sensitive values to tokens does not have to be one-to-one. As in the example above, different tokens could replace the same PAN in two separate data repositories. A token attribute may share a common value with the original underlying value the token attribute is replacing or be specific to the token itself. For example, the token may share the structure of that value, (i.e., the length and character set) or a mechanism to determine that the token is actually a token (i.e., actually represents a replacement value rather than the original underlying value).

A distributed ledger, such as a blockchain, is a series of signed, hash-linked, append-only, timestamped blocks, each block containing arbitrary data. When viewed as a linked-list data structure, a blockchain is a limited data "stack" whose operations only allow users to "push" blocks onto the top. Users are not allowed to modify blocks or to "pull" blocks from the blockchain. Each new block that is added is appended to the topmost block in the stack. A new block links back to the former top-of-stack block by including a hash (e.g., a smaller mathematical representation) of the preceding block in the new block and binding this hash to the new block.

SUMMARY

Various arrangements relate to a method performed by a processor of a computing system. An example method includes tokenizing a first value using a tokenization algorithm to generate a first token. The first value and first key are inputs of the tokenization algorithm. A message is generated. The message includes a first value identifier associated with the first value and a first key generation identifier associated with the generation of the first key. The message is associated with the first token. A second key is generated. A second value is tokenized using a tokenization algorithm to generate a second token. The second value and second key are inputs of the tokenization algorithm.

Various other arrangements relate to a system. The system includes a repository comprising a plurality of messages and a server system. The server system includes a processor and instructions stored in non-transitory machine-readable media. The instructions are configured to cause the server system to tokenize a first value using a tokenization algorithm to generate a first token. The first value and first key are inputs of the tokenization algorithm. A first message is generated. The first message includes a first value identifier associated with the first value and a first key generation identifier associated with the generation of the first key. The first message is associated with the first token. The first value is tokenized using the tokenization algorithm to generate a second token. The first value and second key are inputs of the tokenization algorithm. A second message is generated. The second message includes the first value identifier associated with the first value and a second key generation identifier associated with the generation of the second key. The second message is associated with the second token.

Various arrangements relate to a method performed by a processor of a computing system. An example method includes receiving a token. The token includes a value tokenized using the first value and a key as inputs of a tokenization algorithm. A message associated with the token is identified. The message includes a key generation identifier associated with the key and a value identifier. The value identifier is associated with the value. The key associated with the key identifier is retrieved. The token is detokenized using the key to retrieve the value. The retrieved value is compared with the value associated with the with value identifier.

These and other features, together with the organization and manner of operation thereof, will become apparent from the following detailed description when taken in conjunction with the accompanying drawings, wherein like elements have like numerals throughout the several drawings described below.

Figure 1:
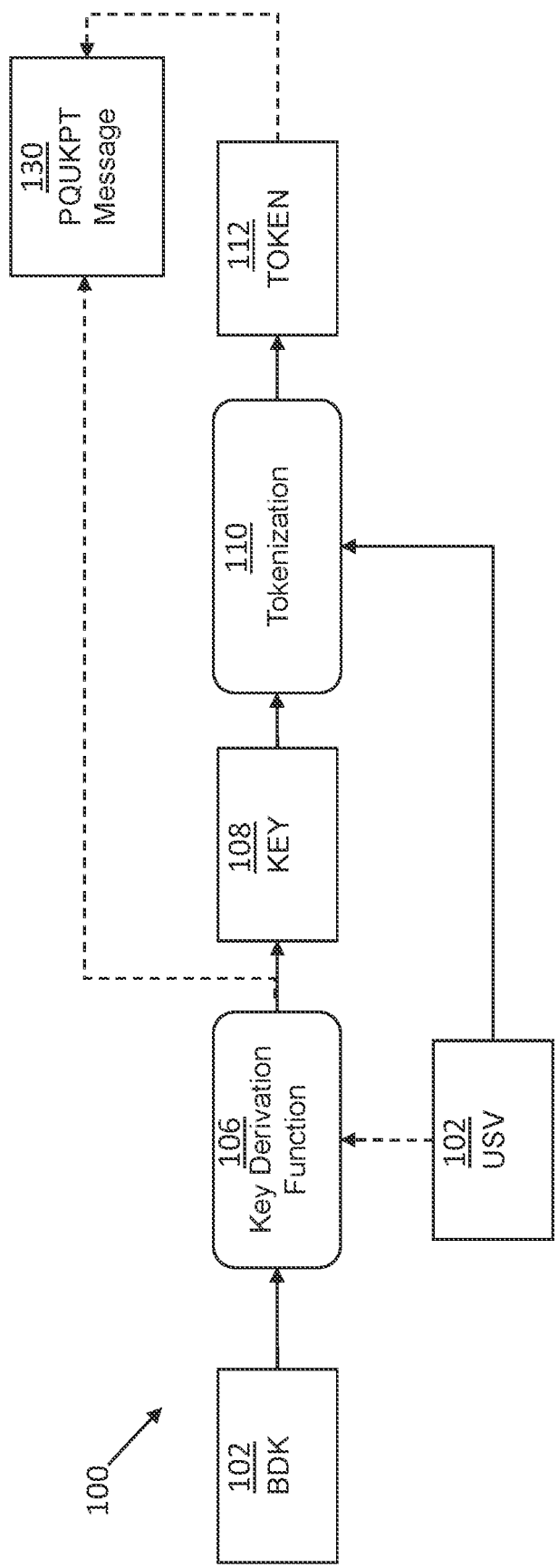
FIG. 1 is a functional block diagram generating a token in a post quantum unique key per token system using a derived key, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

A TSP, or similar encrypting entity, may be configured to protect underlying sensitive values ("USV") or sensitive data as a token on a cloud, blockchain, distributed ledger, or similar repository, and/or transmit the USV along one or more mediums (e.g., internet, P2P, etc, for example, as described in U.S. Pat. No. 10,025,941, entitled "Data Element Tokenization Management," filed on Aug. 23, 2016, and is herein incorporated by reference in its entirety. Under current tokenization systems, a TSP may generate one or more values for a tuple, token, and/or message on the distributed ledger (either through a smart contract, block, etc.) that includes a token. These token(s) may be utilized in transactions, interactions, and communications over various internet-centric services as the tokens provide protection of the sensitive information. Additionally, protection may be implemented by tokenizing a "key" along with the USV, such that a key is used to tokenize all or some of USV from a USV source (e.g., provider, user, documents, etc.). Traditionally, cloud providers themselves manage keys for data stored on their systems, for example, through software or a hardware security module (HSM). No conventional key management schemes therefore destroy keys to ensure that those keys do not remain on the cloud providers' systems because the cloud providers manage the keys. Alternatively, token solutions that retain tokens require a token vault at the server for storing millions of tokens for thousands of clients/customers, making the token vault a rich target for attack and compromise.

Additionally, current tokenization systems are susceptible to key compromise and/or brute force attacks, which are becoming more troublesome with the development of quantum computing. Quantum computing is the utilization of quantum mechanics (e.g., the universe's behavior at the microscopic level) to develop exponentially faster methods of performing certain practical calculations. Generally, in quantum computing or in a quantum computer, one stores quantum information in qubits; qubits perform a role akin to the role of memory in a standard computer. The quantum computer then performs manipulations on the qubits by a sequence of logical quantum gates. Quantum computers are not the only technology where such quantum memories are required. Cryptographic systems that may be resistant to brute force or compromise by traditional computing system may be susceptible to brute force and compromise by quantum computing systems due to the exponentially faster methods of performing certain practical calculations. Some tokenization methods include the use of cryptographic keys. However, the advent of quantum computing might significantly affect such cryptographic-based tokenization methods. Therefore, a post-quantum tokenization (PQT) method might be a unique key per token (UKPT) or PQUKPT, such that the PQUKPT tokenization system provides protection against key compromise and, as a result, compromise of a tokenized set of USVs tokenized using the compromised key.

Referring to the figures generally, various arrangements described herein relate to systems and methods for securely generating, storing, and transmitting a token in a post quantum unique key per token (PQUKPT) system. The PQUKPT system provides a protection-scheme that is per-token or per-instance basis to produce unpredictable and, therefore, difficult to compromise or break tokenization schemas and systems. The PQUKPT system provides additional USV and schema security from key compromise and/or brute force attacks as the key used with the USV in the tokenization schema is an instance-specific (e.g., transaction-specific, post-specific, one-time use, etc.) key. Beneficially, if the key is compromised (e.g., hacked, lost, calculated, etc.), only the generation of that specific token will be compromised. In other words, the PQUKPT system generates a token that is used once per instance (e.g., transaction, post, etc.) and is individually unique to that instance such that different, non-repeated tokens are derived from the same USV (e.g., original data) and/or from the same entity or source (e.g., a system wide tokenization schema with an encryption key). Beneficially, the PQUKPT system facilitates the generation, management, and retrieval of tokens that are unique to, and correspond with, separate instance, but have been derived from the same USV thus impeding compromise of an implemented tokenization schema. In some arrangements, the PQUKPT system generates and stores a PQUKPT message that includes identifiers for the token and associated USV to facilitate detokenization of the token and may provide authentication and non-repudiation of the USV and token. The tokenization schema may be USV specific, data type specific, entity specific, etc. The PQUKPT system may be implemented with a wide variety of tokenization schemas, including on-demand random assignment (ODRA), encryption-based, Message Authentication Code-based (MAC-based), and static table-driven tokenization techniques.

Generally, the ODRA schema does not use a cryptographic key but rather a random number generator (RNG) to replace the USV with a random number. In the ODRA schema, detokenization or verification requires a token vault. The encryption-based schema includes a cryptographic key to encrypt the USV and replace it with the token ("ciphertext"). In the encryption-based method, detokenization or verification do not require a token vault as the USV is recoverable from the token. The MAC-based schema includes a cryptographic key to generate a MAC using symmetric encryption or a keyed-hashed message authentication code. In the MAC-based schema, detokenization requires a token vault as the USV is not recoverable from the token, but verification does not require a token vault as the USV and token can be validated. The static-table driven schema generates a one-time static table using a pseudo random number generator and uses the values in the table as the key. In the static-table driven schema, detokenization or verification does not require a token vault as the USV is recoverable from the token as the table is reversible.

The PQUKPT system may track and allow a user to select attributes of a PQUKPT message that includes the PQUKPT hash such as a string returned, the tokenization method used, and other attributes. Beneficially, the PQUKPT system allows for the USV to be recovered and the token used to be linked to the USV. The PQUKPT system is configured to provide the USV to authorized users, relying parties, and/or authorized third parties to provide assurance and attestation that the token on the blockchain (or other repository) is the linked to the USV. The PQUKPT system may provide the USV to a relying party under protection of a selected encryption mechanism. For example, a Transport Layer Security ("TLS") might be used, a password authentication key exchange ("PAKE") might be used after password authentication, or a biometric authenticate key exchange ("BAKE") might be used after a two factor authentication (biometric+password).

While the systems and methods of the PQUKPT system are described as relating to a TSP, the systems and methods described herein could be implemented in a system that utilizes a key derivation function ("KDF") in a password-based encryption ("PBE") protocol. While the systems and methods of the PQUKPT system are described as being implemented on a blockchain, a wide variety of viewable repositories may have the PQUKPT system implemented within. In some arrangements, the PQUKPT system could be implemented with an application in a smart contract to prevent a breach by a user altering or deleting some USV related to the USV.

The PQUKPT system provides technical solutions to the computer-centric and internet-centric problems associated with conventional data management systems. For example, the PQUKPT system, according to various arrangements, provides a more efficient and effective mechanism to the industry by providing a system that allows for flexible restriction of sensitive content that is stored on a publicly and globally accessible repository of information for periods of time that may exceed the lifetime of encryption techniques, (e.g., sufficient key lengths, trustworthy algorithms, and reliable techniques). This storage is in accordance with industry standards and allows the user to restrict access to data to those with a need to know. The PQUKPT system is applicable to a wide variety of tokenization methods or implementations using cryptographic keys for a wide variety of industries including payments (e.g. EMV), cardholder data (e.g. PCI), healthcare (e.g. HIPAA), and others.

The PQUKPT system provides a system and method to issue and manage tokens that prevent compromise of a token or USV set even when a single token or key is compromised. This is accomplished, in part, through an automated generation of a fresh key for the USV in a tokenization schema that provides independence from compromise of other tokens and USVs generated under that tokenization schema. These problems arise out of the use of computers and the internet, because cloud services and online repositories cannot exist without the use of computers and the internet. Accordingly, problems relating to maintaining and protecting USV (e.g., data elements) on a shared server arise out of computers and the internet. The PQUKPT system, comprising of a tokenization manifest and user-interface, allows for a more effective and reliable medium for users of a multi-access repository to selectively redact, through tokenization, sensitive information. This tokenization system enables real-time restriction and detokenization of sensitive content, responsive to the authorization credentials in the tokenized document. Further, the system and process(es) implemented by the PQUKPT system cannot be practically performed in the human mind, at least because it requires a processor accessing computer memory indicative of tokenization, hashing, and protecting associated USVs.

The PQUKPT system also provides technical solutions to computer-centric and internet-centric problems associated with conventional quantum-vulnerable digital signature systems. The PQUKPT system limits the post quantum capability to determine a symmetric key (e.g., Grover's algorithm) to a single token instead of the cryptographic key for the entire (or a bulk of) the tokenization system. In other words, the PQUKPT system utilizes an instance based key-generation mechanism that prevents compromise of one token and/or key to compromise a set of tokens or keys.

Additionally, the PQUKPT system provides a relying party with all information needed to verify the token and the ability to identify and verify the key used. The PQUKPT system includes token attributed that are suitable for storage in a wide variety of directories, including the X.500-series Directory. The PQUKPT system operates within the deployed tokenization schemes while allowing for the data to be proactively quantum-resistant while providing origin authenticity and data integrity to a message. Further, the PQUKPT system provides technical solutions to computer-centric and internet-centric problems associated with conventional quantum-vulnerable digital signature systems by providing a "future proofing" USVs and tokens within the deployed tokenization schemes. Specifically, the PQUKPT system provides strong protection without having to dedicate processing power or resources to converting digital signature systems to quantum-resistant signature algorithms. In other words, the PQUKPT system allows already deployed, quantum-vulnerable tokenization schemes to continue to be used, while providing a necessary safeguard to protect into the future the integrity and authenticity of content against forged signatures stemming from key compromise. Additionally, the PQUKPT system facilitates the migration and future deployment of quantum-safe algorithms as these become standardized and readily available in vendor solutions. The adoption and implementation of the PQUKPT system can minimize disruption to current systems that require the security services provided by digital signatures.

The PQUKPT system addresses the requirement to protect underlying sensitive data even when it is stored in a publicly accessible environment, such as the cloud, within a blockchain or distributed ledger in a flexible way that is file- and data-element-neutral. The PQUKPT system allows for attestation that the tuple stored on the blockchain actually existed at some point in time, or for some time period, even after the USV was deleted.

As described herein, the term tokenization refers to the process in which a token is substituted as a proxy for data, thus obscuring the underlying data. Accordingly, a token is a surrogate value that can be used to replace some USV. A token can appear to be very similar to the underlying data for which the token is serving as a proxy for, such that that no reconfiguration of systems is required (i.e., the token is "format preserving"). A token attribute may share a common value with the original underlying value that the token is replacing or be specific to the token itself. Alternatively, a token may include access request information. For example, the replacement string of data may include a hyperlink to the TSP provider with the ability to provide the original content. The tokens may be generated, stored, and maintained by an entity that specializes in the tokenization process. A token can be made to look very similar to the underlying data for which the token is serving as a proxy such that that no reconfiguration of systems is required (e.g., the token is "format preserving"). The mapping of underlying sensitive values to tokens does not have to be one-to-one. As in the example above, different tokens could replace the same PAN in two separate data repositories. A token attribute may share a common value with the original underlying value the token is replacing or be specific to the token itself. For example, the token may share the structure of that value (e.g., the length and character set) or a mechanism to determine that the token is actually a token (e.g., actually represents a replacement value rather than the original underlying value).

As used herein, the term "tuple" refers to a data value to be included in a block on a blockchain, a portion of a smart contract, or similar a digital message and/or data entry onto a repository. The tuple comprises a token of a USV and a USV identifier, key identifier, and/or token identifier. The tuple may include a URI or similar query string that is associated with the TSP and/or tokenization schema used to generate the token. Providing the USV identifier provides data integrity, origin authenticity, and non-repudiation of the tuple with respect to the USV. In other words, a relying party may use the URI to retrieve the USV and key associated with the generated token in the tuple and compare the retrieved USV to the detokenized USV in the tuple to confirm that they match.

Referring to FIG. 1, a block diagram of generating a token 112 in a key derivation PQUKPT system 100 is shown, according to an example embodiment. The key derivation PQUKPT system 100 is used to generate a token 112 using a key 108 and USV 102. The key derivation PQUKPT system 100 uses a unique base derivation key (BDK) 104 per each token 112 instead of one or a few keys for the tokenization system, thus increasing sustainability of cryptographic security by reducing risk of key compromise for the entire tokenization system if a single key is compromised. The key derivation PQUKPT system 100 includes a BDK 104, a USV 102, a unique key 108, a token 112, and a PQUKPT message 130. The key derivation PQUKPT system 100 is structured to generate a unique key 108 that is tied to the USV 102 using the BDK 104. The key derivation PQUKPT system 100 generates a PQUKPT message 130 that includes the BDK 104 and a USV identifier for subsequent verification of the token 112 by a relying party. The key derivation PQUKPT system 100 may include a TSP to tokenize the USV 102. The token 112 generated by the key derivation PQUKPT system 100 will have at least the same level of security and protection to the underlying USV as current tokenization management and security systems.

The process of using the key derivation PQUKPT system 100 begins when the key derivation PQUKPT system 100 receives a USV 102. The USV 102 may be any type of content. The content may be a file of any type (e.g., an excel document, JPEG, text document, pdf file, and the like). The USV 102 may have been previously used to generate a token in a prior instance (e.g., transaction, message, date entry, etc.) using a unique key in that instance. In some arrangements, shares of a USV may be represented by a set of tokens such that each tokenized share could be stored in a different physical location. These locations could have different access control requirements and authorization might be limited so that no one user could get all of the USV. This "group tokenization" is able to process (e.g., handle) long values that may not be supported by tokenization vendors or may be implemented for security purposes. For example, a single USV is split into three shares: USVA, USVB, and USVc, with each share being tokenized and stored, optionally, in separate repositories. In some arrangements, each share is linked in a single PQUKPT message.

The key derivation PQUKPT system 100 retrieves a base derivation key 104 to use in a key derivation function 106. In some arrangements, the BDK 104 is generated from a dedicated BDK associated with a given tokenization domain such that a unique BDK is generated to be used with USV metadata. While a distinct key 108 is generated for each instance, in those arrangements, all of the keys (e.g., initialization keys) of an entire family of tokens may be derived from a single key, the BDK 104.

The key derivation PQUKPT system 100 uses the BDK 104 in a key derivation function 106 that is tied to the USV 102 to generate the unique (e.g., instance-specific, token-specific, etc.) key 108. In some arrangements, the key derivation function 106 uses the BDK 104 and USV 102 as inputs into the key derivation function 106 to generate the unique key 108. In some arrangements, the USV 102 is hashed using a hash algorithm and the hash of the USV is salted using some or all of the BDK 104. In other arrangements, the BDK 104 is the input into the key derivation function 106 and the USV 102 is associated with (e.g., linked) with the unique key 108 through a mechanism in the key derivation function 106. In some arrangements, the BDK 104 will produce the same key 108 given the same USV 102 input into the key derivation function 106.

An identifier of the key generation and/or a USV identifier associated with the USV 102 is stored within the key derivation PQUKPT system 100 for subsequent verification with the token 112. In some arrangements, the key derivation PQUKPT system 100 may generate a PQUKPT message 130 that includes a BDK identifier associated with the BDK 104, a key derivation function identifier associated with the key derivation function 106, and a USV identifier of the USV 102. In some arrangements, the PQUKPT message 130 is cryptographically bound under a digital signature. In some arrangements, the PQUKPT message 130 includes a hash of the USV and the a key derivation function identifier that provides the key derivation PQUKPT system 100 with the information necessary to determine how the key 108 was generated.

The key derivation PQUKPT system 100 tokenizes the USV 102 using the key 108 to generate a token 114. The tokenization process includes tokenizing the USV 102 with the key 108 using a tokenization algorithm 110 to generate the token 114. In some arrangements, the USV 102 is an input to the tokenization algorithm 110 and the key 108 is an attribute of the tokenization algorithm 110 such that the key 108 affects the resulting token 112. In other arrangements, the key 108 is prepended or appended to a USV 102 to generate a key USV. The key USV will be recognizable in so far that the USV 102 will remain uninterrupted by the key 108. In other arrangements, the key 108 is prepended or appended to a hash of the USV to generate a key USV. The key USV will be recognizable in so far that the hash of the USV will remain uninterrupted by the key 108. The tokenization algorithm 110 may be one of in a wide variety of tokenization schemas, including on-demand random assignment (ODRA), encryption-based, Message Authentication Code-based (MAC-based), and static table-driven tokenization techniques, described in greater detail above.

In some arrangements, the key derivation PQUKPT system 100 may include a hash of the token, a token identifier, or the token in the PQUKPT message 130 with the identifier of the key generation and/or the USV identifier. In some arrangements, the key derivation PQUKPT system 100 includes a TSP that is structured to receive the USV 102 and the key 108, tokenize the USV using a tokenization algorithm to generate the token 114, and transmit the token 114. In those arrangements, that TSP may be used to detokenize the token during a verification event. As will be appreciated, the TSP does not receive or know the BDK 104 and/or key derivation function 106.

In some arrangements, the key derivation PQUKPT system 100 uses the token 112 to generate a tuple. The tuple may include additional details or attributes. For example, the tuple could include details or attributes signifying a change to the USV (e.g., change of ownership, terms, etc.). In some arrangements, the key derivation PQUKPT system 100 includes a URI in the tuple. The URI identifies where the detokenized token (e.g., USV) is stored. The URI may include plain text content including a string of characters used to identify a source and enables interaction with representations of the resource over a network, such as the internet of things, using specific protocols. Schemes specifying a concrete syntax and associated protocols define each URI. The most common form of URI is a Uniform Resource Locator ("URL"). The URI would allow a relying party to retrieve the USV from the token 112 (e.g., detokenize the token 112) by providing a reference to the token 112.

The key derivation PQUKPT system 100 will subsequently use a new key 108—and therefore generate a new token 110—when the same USV 102 is tokenized (e.g., used) again. Additionally, the key derivation PQUKPT system 100 will subsequently use a new key 108 when a new USV is to be tokenized. In other words, the key derivation PQUKPT system 100 will use a new key 108 for all instances within the given tokenization domain. By way of example, the key derivation PQUKPT system 100 could be implemented to impede database compromise. The USV 102 is documentation and information related to the property (property info). The BDK 104 is input into a key derivation function 106 that includes the property info to generate a first key that is tied to the property info. The property info is tokenized using the first key (e.g., key 108) in a tokenization schema to generate a first token (e.g., token 112). A token identifier associated with the first token is stored in the PQUKPT message 130 along with a USV identifier and, optionally, a key derivation function identifier. The USV identifier and the derivation function identifier are subsequently used to replicate the first key. In some arrangements, the first key is stored in the PQUKPT message 130. Subsequently, the property info changes ownership such that a second token is needed. The same BDK 104 is retrieved and is input into a key derivation function 106 that includes the property info to generate a second key that is tied to the property info. The property info is tokenized using the second key (e.g., key 108) in a tokenization schema to generate a second token (e.g., token 112) that is distinct from the first token. A token identifier associated with the second token is stored in a new PQUKPT message 130 along with a USV identifier and, optionally, a key derivation function identifier. In some arrangements, the token identifier associated with the second token is wrapped and/or included in the PQUKPT message 130 that includes the first token identifier. In these arrangements, a relying party would be able to "link" all previous tokens by accessing the PQUKPT message 130 that includes the various token identifiers.

Figure 2:
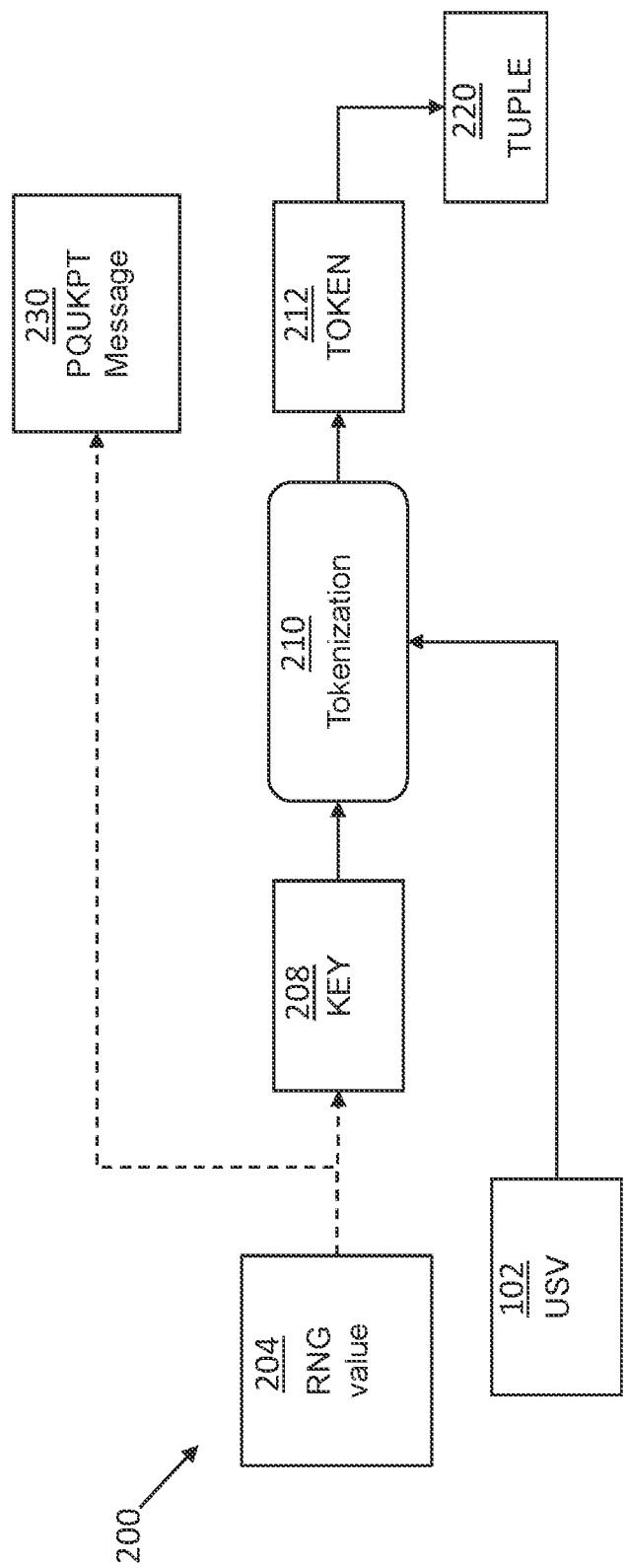
FIG. 2 is a functional block diagram generating a token in a post quantum unique key per token system using a random key, according to another example embodiment.

Referring to FIGS. 1-2, a block diagram of generating a tuple in a random PQUKPT system 200 is shown, according to an example arrangement. The random PQUKPT system 200 is similar to the PQUKPT system of FIG. 1. A difference between the random PQUKPT system 200 and the key derivation PQUKPT system 100, is the random PQUKPT system 200 generates a key 108 using a random value that is unique (e.g., randomized) for each instance. Accordingly, similar aspects of the random PQUKPT system 200 and the key derivation PQUKPT system 100 will have like numbering. In some arrangements, a PQUKPT system may be structured to implement either method of the key derivation PQUKPT system 100 and the random PQUKPT system 200.

The random PQUKPT system 200 is used to generate a tuple 220 that includes a token 212 of the USV 102 and an identifier of the PQUKPT message 230 or identifier of the RNG value 204. The random PQUKPT system 200 is used to generate a token 212 using a key 208 generated from the RNG value 204 and USV 102. The tuple 220 and/or PQUKPT message 230 are structured for subsequent verification by a relying party. The random PQUKPT system 200 may include a TSP to tokenize the USV 102. The process of using the random PQUKPT system 200 begins as the random PQUKPT system 200 receives a USV 102. The USV 102 may be any type of content. The content may be a file of any type (e.g., an excel document, JPEG, text document, pdf file, and so on). The USV 102 may have been previously used to generate a tuple in a prior iteration.

The random PQUKPT system 200 retrieves a RNG value 204. The RNG value 204 may be a randomly generated string that includes letters, numbers, symbols, and other characters. The RNG value 204 may be a nonce. In some arrangements, the RNG value 204 is retrieved from an entropy source associated with at least one of the physical aspects of the system and logical aspect of the system. In some arrangements, the RNG value 204 is retrieved from a quantum random number generator using quantum effects. The RNG value 204 that is generated is stored within the random PQUKPT system 200 for subsequent verification with the tuple 220. In some arrangements, the random PQUKPT system 200 may generate a PQUKPT message 230 that includes the RNG value 204 and an identifier 222 of the USV 102. In some arrangements, the PQUKPT message 230 is cryptographically bound under a digital signature. In some arrangements, the PQUKPT message 230 includes a token identifier of the token 212 generated and the RNG value 204.

The random PQUKPT system 200 uses the RNG value 204 to generate the unique (e.g., instance-specific, token-specific, etc.) key 208. In some arrangements, the RNG value 204 is the unique key 108, such that the RNG value 204 is prepended or appended to the USV 102 to generate a RNG USV to be tokenized. In other arrangements, the RNG value 204 is iteratively hashed before being an input into the tokenization algorithm with the USV 102. In those arrangements, the RNG value 204 is hashed to generate a first hash, the first hash is hashed again (using the same hashing algorithm) to generate a second hash, and the second hash is hashed again (using the same hashing algorithm) to generate the third hash which is the key 208. In even further arrangements, the RNG value 204 is input into a pseudo random generator to generate the key 208.

A difference between the random PQUKPT system 200 and the key derivation PQUKPT system 100 of FIG. 1, is the key 208 of the random PQUKPT system 200 needs to be retained, while the key 108 of the key derivation PQUKPT system 100 can be destroyed and recreated subsequently. In some arrangements, the PQUKPT message 230 includes the key 208 or a key identifier. In other arrangements, an identifier of the key generation and/or an RNG identifier associated with the RNG value 204 is stored within the random PQUKPT system 200 for subsequent verification with the token 212. In some arrangements, the random PQUKPT system 200 may generate a PQUKPT message 230 that includes an RNG identifier associated with the RNG value 204, and a USV identifier of the USV 102. In some arrangements, the PQUKPT message 230 is cryptographically bound under a digital signature. In some arrangements, the PQUKPT message 230 includes a hash of the USV and the a RNG key generation identifier that provides the random PQUKPT system 200 with the information necessary to determine how the key 208 was generated.

In some arrangements, the key 208 is cryptographically protected when stored. For example, the key 208 may be protected by implementing one or more of CMS X9.73 messages (e.g., SignedData, EncryptedData,), asymmetric cryptography (e.g. Signcryption, X9.73, ISO/IEC 29150), digital signatures (e.g. RSA, X9.31, DSA, FIPS 186-4, ECDSA, X9.62) and/or known encryption algorithms (e.g. AES 256, FIPS 197), keyed hash message authentication code (HMAC) algorithm (FIPS 198 1)) using hash algorithms (e.g., SHA 256, FIPS 180 4) or suitable key derivation algorithms (e.g. SHA 256, FIPS 180 4).

The random PQUKPT system 200 tokenizes the USV 102 using the key 208 to generate a token 212. The tokenization process includes tokenizing the USV 102 with the key 208 using a tokenization algorithm 210 to generate the token 212. In some arrangements, the USV 102 is an input to the tokenization algorithm 210 and the key 208 is an attribute of the tokenization algorithm 210 such that the key 208 affects the resulting token 212. In other arrangements, the key 208 is prepended or appended to a USV 102 to generate a key USV. The key USV will be recognizable in so far that the USV 102 will remain uninterrupted by the key 208. In other arrangements, the key 208 is prepended or appended to a hash of the USV to generate a key USV. The key USV will be recognizable in so far that the hash of the USV will remain uninterrupted by the key 208. The tokenization algorithm 210 may be one of in a wide variety of tokenization schemas, including on-demand random assignment (ODRA), encryption-based, Message Authentication Code-based (MAC-based), and static table-driven tokenization techniques, described in greater detail above.

In some arrangements, the random PQUKPT system 200 may include a hash of the token, a token identifier, or the token in the PQUKPT message 230 with the identifier of the key generation and/or the USV identifier. In some arrangements, the random PQUKPT system 200 includes a TSP that is structured to receive the USV 102 and the key 208, tokenize the USV using a tokenization algorithm to generate the token 212, and transmit the token 212. In those arrangements, that TSP may be used to detokenize the token during a verification event. As will be appreciated, the TSP does not receive or know the RNG value 204.

The random PQUKPT system 200 uses the token 212 to generate a tuple 220. The tuple 220 may include additional details or attributes. For example, the tuple 220 could include details or attributes signifying a change to the USV (e.g., change of ownership, terms, etc.). In some arrangements, the random PQUKPT system 200 includes a URI in the tuple 220. The URI identifies where the detokenized token (e.g., USV) is stored. The URI may include plain text content including a string of characters used to identify a source and enables interaction with representations of the resource over a network, such as the internet of things, using specific protocols. Schemes specifying a concrete syntax and associated protocols define each URI. The most common form of URI is a Uniform Resource Locator ("URL"). The URI would allow a relying party to retrieve the USV from the token 212 (e.g., detokenize the token 212) by providing a reference to the token 212.

The random PQUKPT system 200 will subsequently use a new RNG value 204 to generate a new key 208—and therefore generate a new token 210—when the same USV 102 is tokenized (e.g., used) again. Additionally, the random PQUKPT system 200 will subsequently use a new RNG value 204 to generate a new key 208 when a new USV is to be tokenized. In other words, the random PQUKPT system 200 will use a new key 208 for all instances within the given tokenization domain. By way of example, the random PQUKPT system 200 could be implemented to impede database compromise. The USV 102 is digital/electronic documentation and information related to the employment agreement. The data corresponding to the employment agreement is prepended with a first key (e.g., key 208) that is a twenty-character number string RNG value 204. The employment info is tokenized using the first key (e.g., key 208) in a tokenization schema to generate a first token (e.g., token 212). A token identifier associated with the first token is stored in the PQUKPT message 230 along with the first key or first key identifier. The first key or first key identifier are subsequently used to replicate the first key.

Subsequently, the employment agreement is renewed (e.g., monthly) such that a second tuple is needed. A new RNG value 204 is retrieved and is used as a second key that is tied to the employment info. The employment info is tokenized using the second key (e.g., key 208) in a tokenization schema to generate a second token (e.g., token 212) that is distinct from the first token. A token identifier associated with the second token is stored in a new PQUKPT message 230 along with the second key or second key identifier and, optionally, a USV identifier. In some arrangements, the token identifier associated with the second token is wrapped and/or included in the PQUKPT message 230 that includes the first token identifier. In these arrangements, a relying party would be able to "link" all previous tokens by accessing the PQUKPT message 230 that includes the various token identifiers. In order to link the first USV 102 to the new, second USV 102, the PQUKPT message 230 may include a hash of the first USV 102 along with the RNG value 204 used to generate the first key.

The random PQUKPT system 200 may digitally sign the PQUKPT message 230 to ensure the integrity and authenticity of origin for all information included therein. In some arrangements, a single PQUKPT message 230 is generated for a given USV 102 where each instance of generating a new token for the USV 102 (e.g., generating a tuple) is wrapped over the previous instance. In other words, the PQUKPT message 230 is a nested or encapsulated message that includes the most recent instance of key used to generate a tuple 220 wrapped over previous key(s) 204 and the associated tuple(s) 220. The PQUKPT message 230 is a "single" message that links the tuples that include the USV 102 off the blockchain and away from unauthorized third parties.

In some arrangements, the PQUKPT message 130 or 230 may be digitally signed. Authenticity and data integrity of the PQUKPT message 130 or 230 can be determined based on each of the digitally signed elements of the PQUKPT message 130 or 230. Additional identifiers (e.g., OIDs) may be bound to the message 130 or 230, including the information related to the generated tuple. For example, an identifier could be associated with the underlying USV, the token generated, a userID, time stamp, etc. The key derivation PQUKPT system 100 and 200 may utilize SignedData, detached SignedData, and SigncryptedData message schema, each of which provides unique functionality. Generally, the digital signature process is also referred to as "signing a message digest." The message digest includes hash values that represent the specific, digitally signed time-based digital signature messages in the time-based digital signature system. A message digest is assigned to particular data content such that a change to any of the content within a time-based digital signature message will be reflected in the message digest. In some arrangements, the message digest includes a direct signature that does not first hash the information to be protected before signing the content. In some arrangements, a signature key that includes a set of private data elements specific to an entity and usable only by this entity in the signature process may be used for the digital signature process. Under the CMS message type SignedData, there may be more than one message signer, each using a different public-private key pair and signature algorithm.

Referring generally to the use of the SignedData schema with an random hash (e.g., random PQUKPT system 200 of FIG. 2), a SignedData message is generated at each block in the PQUKPT message 130 or 230 encapsulation. Each successive block in the processing chain wraps another SignedData message around the previous message, and additional attributes can be added to the SignedData messages added to the associated PQUKPT message 130 or 230 and/or tuple. Using the detached SignedData schema, a hash of the PQUKPT message 130 or 230 is signed at each block in the processing chain and is transmitted out-of-band. Confidentiality is maintained throughout the process as the actual processing message content is not present. With SignedData or detached SignedData, each financial institution can perform recursive descent at each step in the PQUKPT message 130 or 230 encapsulation to validate the integrity of each layer of the PQUKPT message 130 or 230 at each block.

The key derivation PQUKPT system 100 and 200 may be used to verify digital signatures in connection with secure communications, funds transfers, e-commerce transactions, or other digitally signed messages (e.g., cloud-based, blockchain-based, distributed ledgers, or smart contract systems) and to provided third-party anonymity, but accessible linkage to postings on a blockchain. The systems and methods address the requirement to protect data for long term retention even when the underlying sensitive data is stored in a publicly accessible environment, such as the cloud or within a blockchain, distributed ledger, and/or smart contracts, in a flexible way that is file and data-element neutral. In some arrangements, to provide integrity, authentication, and/or non-repudiation, the PQUKPT messages 130 or 230 are bound by a TST and/or digitally signed by the time-key derivation PQUKPT system 100 and 200.

Figure 3:
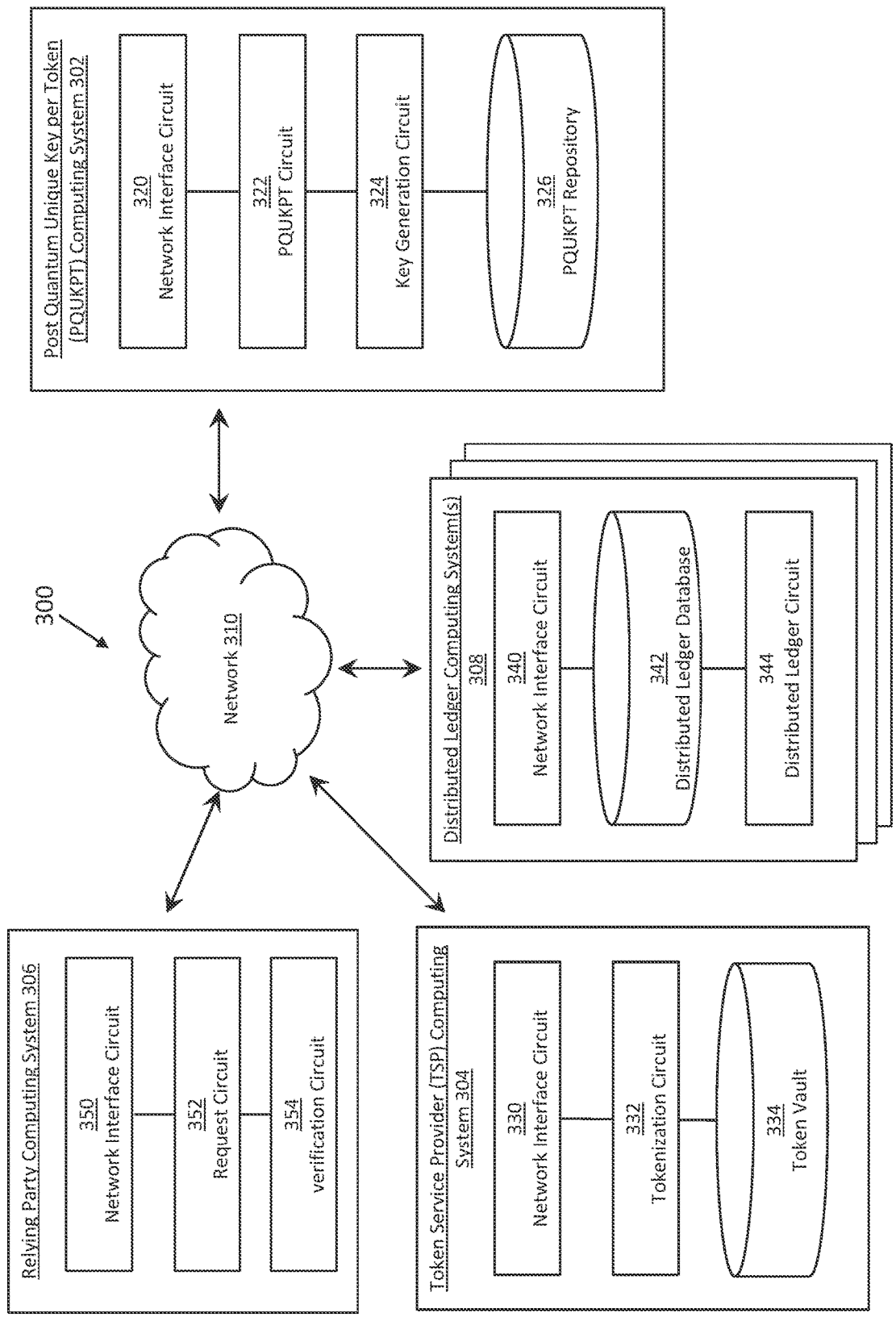
FIG. 3 is a schematic diagram of a post quantum unique key per token system, according to an example embodiment.
Figure 4:
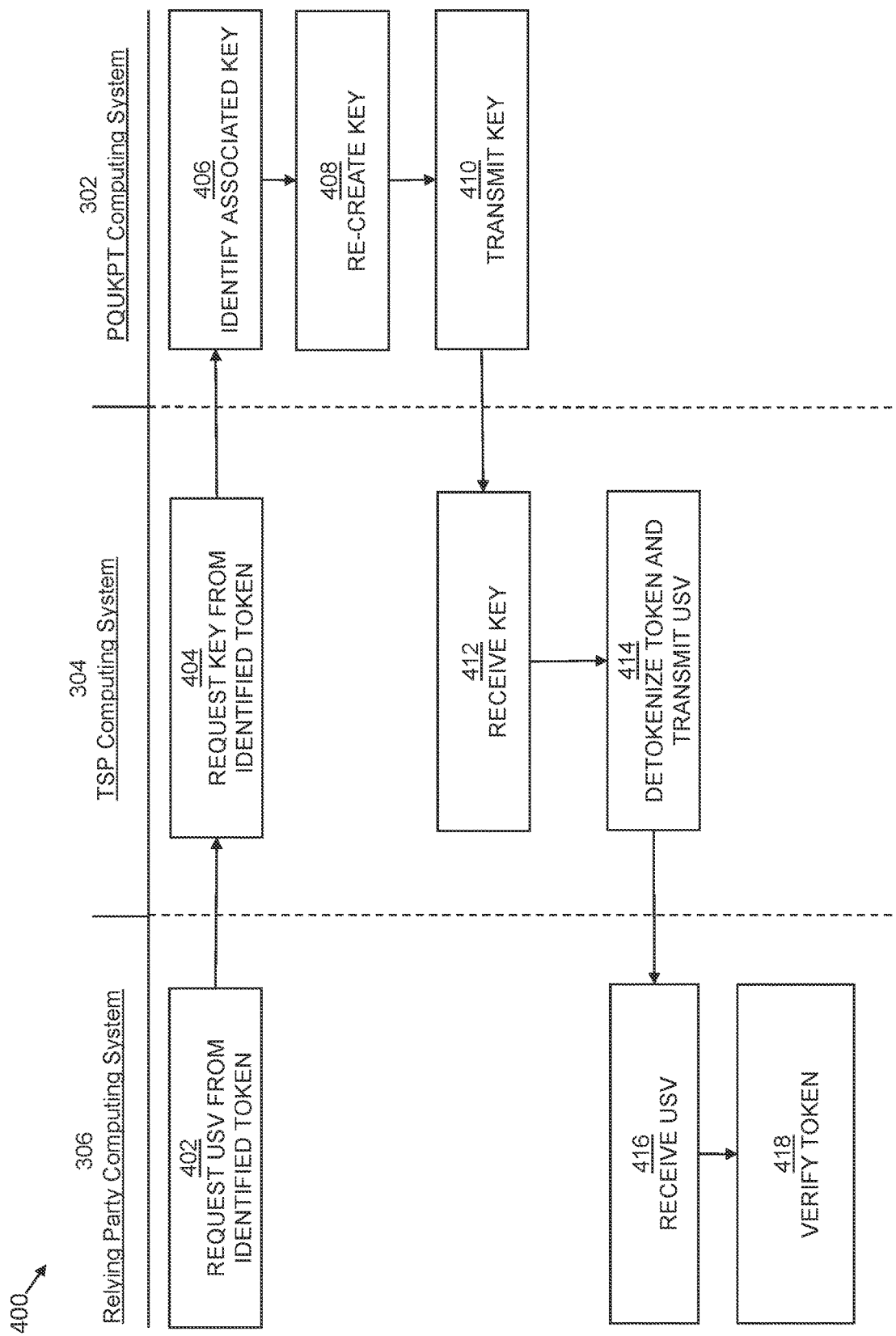
FIG. 4 is a flow diagram of a method of validating a token in the post quantum unique key per token system of FIG. 1, according to an example embodiment.
Figure 5:
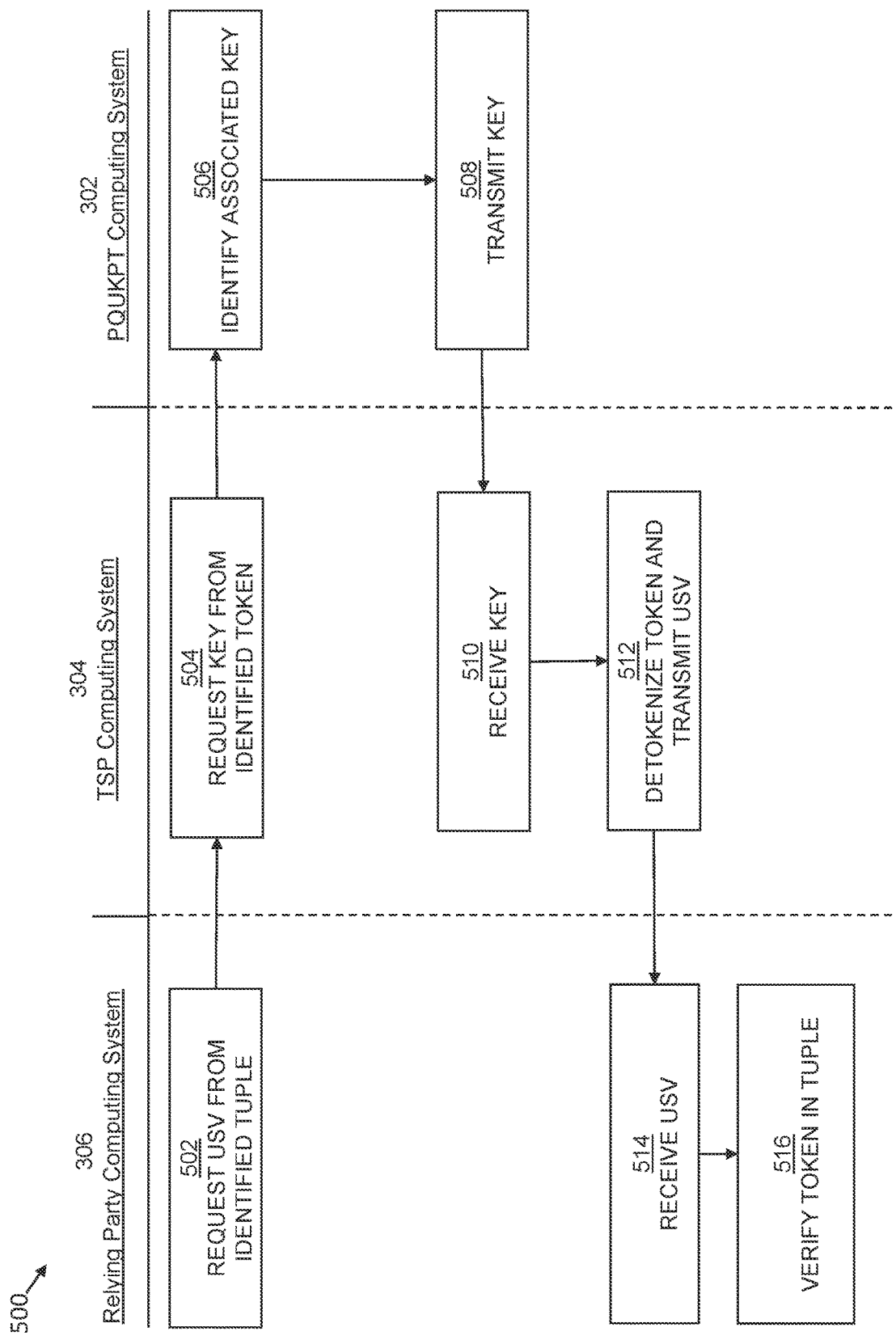
FIG. 5 is a flow diagram of a method of validating a token in the post quantum unique key per token system of FIG. 2, according to an example embodiment.

FIG. 3 is a schematic diagram of a PQUKPT system 300, according to an example arrangement. Referring to FIGS. 1-3, the PQUKPT system 300 includes a PQUKPT computing system 302, a TSP computing system 304, a relying party computing system 306, and a distributed ledger 308. Each of the PQUKPT computing system 302, the TSP computing system 304, the relying party computing system 306, and the distributed ledger 308 are in operative communication with the others via a network 310. According to various arrangements, the PQUKPT system 300 may be utilized to implement the generation method of the key derivation PQUKPT system 100 of FIG. 1, random PQUKPT system 200 of FIG. 2, the verification method 400 of FIG. 4, and the verification method 500 of FIG. 5. While the TSP computing system 304 and the PQUKPT computing system 302 are shown as separate entities in FIG. 3, in some arrangements the PQUKPT computing system 302 performs some of or all of the functions of the TSP computing system 304, as described herein. In some arrangements, one or both of the PQUKPT computing system 302 and the TSP computing system 304 are managed and operated by a financial institution. However, in other arrangements, one or both of the PQUKPT computing system 302 and the TSP computing system 304 are managed and operated by a third-party that is external to a financial institution.

The PQUKPT computing system 302 includes a network interface circuit 320, a PQUKPT circuit 322, a key generation circuit 324, and a PQUKPT repository 326. The network interface circuit 320 is structured to facilitate operative communication between the PQUKPT computing system 302 and other systems and devices over the network 310. The PQUKPT circuit 322 is configured to receive a USV and prepare a token, tuple, and PQUKPT message (or other storage of the key information). The PQUKPT circuit 322 may be structured to carry out the generation method of the key derivation PQUKPT system 100 of FIG. 1 and the random PQUKPT system 200 of FIG. 2. The PQUKPT circuit 322 may communicate with the TSP computing system 304 to transmit the USV (or USV) for tokenization and receive a token. The PQUKPT circuit 322 is in communication with the key generation circuit 324 to retrieve a key. The PQUKPT circuit stores the used key (and any hashing information, key generation algorithm information, etc.) in the PQUKPT repository 326. In some arrangements, the PQUKPT circuit 322 generates a PQUKPT message that includes the key and a hash of the tuple or other attribute associated with the tuple generated. In those arrangements, the PQUKPT message may be stored in the PQUKPT repository 326.

The TSP computing system 304 includes a network interface circuit 330, a tokenization circuit 332, and a token vault 334. The network interface circuit 330 is structured to facilitate operative communication between the TSP computing system 304 and other systems and devices over the network 310. As will be appreciated, the term token refers generally to the tokenized data. The TSP computing system 304 may, for example, include one or more servers each with one or more processors configured to execute instructions stored in a memory, send and receive data stored in the memory, and perform other operations to implement the services described herein associated with the processing modules, databases, and processes. In some arrangements, some or all of the functions of the TSP computing system 304 are managed by the tSP computing system 302.

The network interface circuit 330 is structured to facilitate operative communication between the TSP computing system 304 and other systems and devices over the network 310.

The tokenization circuit 332 is structured to organize and facilitate the tokenization (e.g., replacing cleartext with a token) of any biometric sample data received. This includes tokenizing and detokenizing the USV 102. In some arrangements, the tokenization circuit 332 may provide an OID with the tokenized USV returned to the PQUKPT computing system 302 for inclusion in the tuple. For example, the OID could represent a TSP identifier, tokenization schema, or other information to assist the TSP computing system 306 in processing a tokenization or detokenization request from the PQUKPT computing system 302 and/or a detokenization request from the relying party computing system 306. In some arrangements, the PQUKPT computing system 302 may transmit a detokenization request with the token to the TSP computing system 306. In some arrangements, the tokenization circuit 332 may examine an OID (e.g., either as a signed attribute or included in the PQUKPT message) with the received token.

The token vault 334 is structured to store the tokenization schemas that the TSP has implemented to tokenize data to facilitate the detokenization of the tokenized data. In some arrangements, the token vault 334 includes the plaintext data associated with the generated tokens. The token vault 334 contains information related to the generation of the tokens (e.g., the requesting entity, encryption algorithms used, the original content, processing information, etc.). Once a relying party computing system 306 is authorized to access one or more tokens and can provide the proper key used in the generation of the token, the token vault 334 supplies the information for the authorized USV. In some arrangements, the token vault 334 stores any authentication information associated with the token, for example, a plurality of user names and passwords that are allowed to access the tokenized redacted content. In other arrangements, the access information is stored in an accounts database. The accounts database may store the access control information for the plurality of tokens generated and stored in the tokens vault 334. For example, a requesting entity may have a single password with the TSP that allows the requesting entity to detokenize any data to which the requesting entity has access.

The relying party computing system 306 includes a network interface circuit 350, a request circuit 352, and a verification circuit 354. The network interface circuit 350 is structured to facilitate operative communication between the relying party computing system 306 and other systems and devices over the network 310. The relying party computing system 306 may use the network interface circuit 350 to retrieve a token or tuple on the one or more distributed ledger computing systems 308 over the network 310. Once the tuple is retrieved, the request circuit 352 identifies the URI, or similar access information, stored within the tuple and requests for the token to be detokenized and for the key used to generate the token. The request circuit 352 may be configured to provide authentication information necessary to detokenize the token from the TSP computing system 304 and/or access the key from the PQUKPT computing system 302. This may require submitting the token to the TSP computing system 304 and the tuple, token, or other identifying information to the PQUKPT computing system 302 to retrieve the properly associated key.

Once the key and the detokenized token (e.g., USV) are retrieved, the verification circuit 354 uses the key and the USV to generate a verification token. The verification token is compared to the token in the tuple. If the verification token matches the token, the USV and tuple are validated. Subsequent tuples may be retrieved from the one or more distributed ledger computing systems 308 and verified to "link" the tuples that include the same USV.

The one or more distributed ledger computing systems 308 are associated with the distributed ledger for which the PQUKPT computing system 302 stores generated tuples. For example, the one or more distributed ledger computing systems 308 may be or include a central computer network storing the distributed ledger, computer nodes verifying transactions posted to the distributed ledger, computer nodes posting transactions to the distributed ledger, and so on. In various arrangements, the distributed ledger may be a permissionless or a permissioned ledger. If permissionless, the one or more distributed ledger computing systems 308 may include any computing system capable of downloading transactions posted to, verifying transactions posted to, and/or posting transactions to the distributed ledger. If permissioned, the one or more computing systems 308 may be associated with one or more trusted entities given access to the distributed ledger for the purposes of posting transactions and verifying transactions posted to the distributed ledger. In some arrangements, the distributed ledger computing system 308 may further be a single computing system, for example, trusted to verify and maintain a distributed ledger.

The one or more distributed ledger computing systems 308 each include at least a network interface circuit 340, a distributed ledger database 342, and a distributed ledger circuit 344. The network interface circuit 340 is adapted for and configured to establish a communication session via the network 310 with other components of the PQUKPT system 300. As used herein, a "network interface" may include any of a cellular transceiver (Code Division Multiple Access ("CDMA"), Global System for Mobile Communications ("GSM"), Long-Term Evolution ("LTE"), etc.), a wireless network transceiver (e.g., 802.11X, ZigBee, Bluetooth, etc.), and a combination thereof (e.g., both a cellular transceiver and a Bluetooth transceiver). The distributed ledger circuit 344 is configured to retrievably store information relating to the distributed ledger from the distributed ledger database 342. Accordingly, the distributed ledger database 342 may store the entirety or part of a distributed ledger, for example, downloaded from a central computing system or from other distributed ledger computing systems 308. It should be understood, however, that in some arrangements, the one or more distributed ledger computing systems 308 may include components in addition to the network interface circuit 340 and the distributed ledger database 342. As an illustration, a given distributed ledger computing system 308 may include an input/output circuit, a display, etc.

Referring to FIGS. 1-4, a flow diagram of a method 400 of verifying a token is illustrated, according to an example arrangement. The token may be the token 112 generated by the key derivation PQUKPT system 100 of FIG. 1. The method 400 is shown in connection with a PQUKPT computing system 302, the TSP computing system 304, and the relying party computing system 306. The method 400 could be performed by an external third party (e.g., an entity that manages the relying party computing system 306 of FIG. 3). Additionally, the method 400 may be similarly performed by other systems and devices.

The method 400 begins at 402 with the relying party computing system 306 identifying a token and requesting the USV from the token from the TSP computing system 304. The relying party computing system 306 may identify the entity associated with the key through a URI or other attribute included with the token. The relying party computing system 306 may need to transmit authentication information to the TSP computing system 304 and/or the PQUKPT computing system 302 to retrieve the USV. In some arrangements, the relying party computing system 306 identifies the entity associated with the token through a URI or other attribute associated with or included with the token and transmits a detokenization request that includes the key. In some arrangements, the relying party computing system 306 may also transmit a USV received from the PQUKPT computing system 302 along with the key. The relying party computing system 306 may need to transmit authentication information to the TSP computing system 304 to detokenize the token. In some arrangements, the steps of the relying party computing system 306 are accomplished by the PQUKPT computing system 302.

At 404, the request is received by the TSP computing system 304 and the TSP computing system 304 transmits a request to the PQUKPT computing system 302 for a key from the identified token. The TSP computing system 304 may retrieve key request information from the token provided by the relying party computing system 306 at 402. For example, the TSP computing system 304 may have a token-key request database with the requisite key request information associated with each token.

At 406, the PQUKPT computing system 302 receives the key request and identifies the associated key. Since the key is destroyed, the key has to be recreated, requiring the PQUKPT computing system 302 to retrieve the associated USV, BDK, and any key generation derivation function information associated with the identified key/token. The PQUKPT computing system 302 may use the URI, the token, a user identifier associated with the relying party computing system 306, authentication information, or other data to identify the key associated with the token. In some arrangements, the key may be encrypted and stored on a secure database. In some arrangements, an identifier in the token directs the PQUKPT computing system 302 to a first repository that includes the USV and a key identifier. The key identifier identifying the key stored on a second repository. In other arrangements, the token includes a PQUKPT message identifier, such that the PQUKPT computing system 302 retrieves a PQUKPT message that includes the key and/or a key identifier (e.g., pointer to a repository including the encrypted key).

At 408, the key is recreated by using the identified USV and BDK in the key derivation function identified at 404. At 410, the PQUKPT computing system 302 transmits the key to the TSP computing system 304. The transmission may be an encrypted transmission.

At 412, the TSP computing system 304 receives the key from the PQUKPT computing system 302. At 414, the token is detokenized using the key to retrieve the USV and the plaintext USV is transmitted to the relying party computing system 306. The TSP computing system 304 detokenizes the token according to the associated tokenization schema used to previously tokenize the USV.

At 416, the relying party computing system receives the USV from the TSP computing system 304. In some arrangements, the steps of the relying party computing system 306 are accomplished by the PQUKPT computing system 302.

At 418, the relying party computing system 306 verifies the token and USV. In some arrangements, the relying party computing system 306 compares a fresh token generated using the key and the USV to the token in the identified token at 402. If they match, the token is validated. In those arrangements, the fresh token may be generated by the PQUKPT computing system 302 and/or TSP computing system 304. In some arrangements, the blocks of the relying party computing system 306 are accomplished by the PQUKPT computing system 302.

Referring to FIGS. 1-5, a flow diagram of a method 500 of verifying a tuple is illustrated, according to an example arrangement. The tuple may be the tuple 220 generated by the random PQUKPT system 200 of FIG. 2. The method 500 is shown in connection with a PQUKPT computing system 302, the TSP computing system 304, and the relying party computing system 306. The method 500 could be performed by an external third party (e.g., an entity that manages the relying party computing system 306 of FIG. 3). Additionally, the method 500 may be similarly performed by other systems and devices.

The method 500 begins at 502 with the relying party computing system 306 identifying a token and requesting the USV from the token from the TSP computing system 304. The relying party computing system 306 may identify the entity associated with the key through a URI or other attribute included with the token. The relying party computing system 306 may need to transmit authentication information to the TSP computing system 304 and/or the PQUKPT computing system 302 to retrieve the USV. In some arrangements, the relying party computing system 306 identifies the entity associated with the token through a URI or other attribute associated with or included with the token and transmits a detokenization request that includes the key. In some arrangements, the relying party computing system 306 may also transmit a USV received from the PQUKPT computing system 302 along with the key. The relying party computing system 306 may need to transmit authentication information to the TSP computing system 304 to detokenize the token. In some arrangements, the steps of the relying party computing system 306 are accomplished by the PQUKPT computing system 302.

At 504, the request is received by the TSP computing system 304 and the TSP computing system 304 transmits a request to the PQUKPT computing system 302 for a key from the identified token. The TSP computing system 304 may retrieve key request information from the token provided by the relying party computing system 306 at 502. For example, the TSP computing system 304 may have a token-key request database with the requisite key request information associated with each token.

At 506, the PQUKPT computing system 302 receives the key request and identifies the associated key. The PQUKPT computing system 302 may use the URI, the tuple, a user identifier associated with the relying party computing system 306, authentication information, or other data to identify the key associated with the tuple. The key may be encrypted and stored on a secure database. In some arrangements, an identifier in the tuple directs the PQUKPT computing system 302 to a first repository that includes the USV and a key identifier. The key identifier identifying the key stored on a second repository. In other arrangements, the tuple includes a PQUKPT message identifier, such that the PQUKPT computing system 302 retrieves a PQUKPT message that includes the key and/or a key identifier (e.g., pointer to a repository including the encrypted key). At 506, the PQUKPT computing system 302 transmits the KEY to the relying party computing system 306. The transmission may be an encrypted transmission. In some arrangements, an identifier in the token directs the PQUKPT computing system 302 to a first repository that includes the USV and a key identifier. The key identifier identifying the key stored on a second repository. In other arrangements, the token includes a PQUKPT message identifier, such that the PQUKPT computing system 302 retrieves a PQUKPT message that includes the key and/or a key identifier (e.g., pointer to a repository including the encrypted key).

At 508, the PQUKPT computing system 302 transmits the key to the TSP computing system 304. The transmission may be an encrypted transmission.

At 510, the TSP computing system 304 receives the key from the PQUKPT computing system 302. At 512, the token is detokenized using the key (e.g., random character string) to retrieve the USV and the plaintext USV is transmitted to the relying party computing system 306. The TSP computing system 304 detokenizes the token according to the associated tokenization schema used to previously tokenize the USV.

At 514, the relying party computing system receives the USV from the TSP computing system 304. In some arrangements, the steps of the relying party computing system 306 are accomplished by the PQUKPT computing system 302.

At 516, the relying party computing system 306 verifies the token in the tuple. In some arrangements, the relying party computing system 306 compares a fresh token generated using the key and the USV to the token in the identified token at 502. If they match, the token is validated. In those arrangements, the fresh token may be generated by the PQUKPT computing system 302 and/or TSP computing system 304. In some arrangements, the blocks of the relying party computing system 306 are accomplished by the PQUKPT computing system 302.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus; for example, the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, video and audio recording devices, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed:

1. A method, comprising:
    generating, by a computing system, via a key derivation function receiving as input a value and a base derivation key, a key;
    tokenizing, by the computing system, via a tokenization algorithm receiving as input the value and the key, the key into a token; and
    generating, by the computing system, a message associated with the token and comprising a value identifier associated with the value and a key generation identifier associated with the generation of the key.

2. The method of claim 1, wherein the key generation identifier comprises:
    a key derivation function identifier associated with the key derivation function; and
    a base derivation key identifier associated with the base derivation key, wherein the key derivation function identifier, the base derivation key identifier, and the value are used to regenerate the key.

3. The method of claim 2, wherein the message is a first message, further comprising:
    generating, by the computing system, a second message, the second message comprising a second value identifier associated with a second value, the key derivation function identifier associated with the key derivation function, and the base derivation key identifier associated with the base derivation key, wherein the key derivation function identifier, the base derivation key identifier, and the second value are used to regenerate the key,
    wherein the second message is associated with a second token.

4. The method of claim 1, wherein generating the key, wherein the key is a first key, further comprises:
    determining, by the computing system, a random character string; and
    generating, by the computing system, the first key using the random character string; and
    wherein generating a second key comprises:
    determining, by the computing system, a second random character string; and
    generating, by the computing system, the second key using the second random character string.

5. The method of claim 4, wherein the key generation identifier comprises the random character string.

6. The method of claim 5, wherein the message is a first message, further comprising:
    generating, by the computing system, a second message, the second message comprising a second value identifier associated with a second value, a second key generation identifier that comprises the second random character string, wherein the second message is associated with a second token.

7. The method of claim 1, further comprising:
    generating, by the computing system, a second key using the base derivation key, a second value, and the key derivation function; and
    tokenizing, by the computing system, the second value using the tokenization algorithm to generate a second token, wherein the second value and the second key are inputs of the tokenization algorithm.

8. A system comprising:
    a repository comprising a plurality of messages;
    a server system, the server system comprising a processor and instructions stored in non-transitory machine-readable media, the instructions configured to cause the server system to:
    generate, via a key derivation function receiving as input a value and a base derivation key, a key;
    tokenize, via a tokenization algorithm receiving as input the value and the key, the key into a token; and
    generate a message associated with the token and comprising a value identifier associated with the value and a key generation identifier associated with the generation of the key.

9. The system of claim 8, wherein the key generation identifier comprises a key derivation function identifier associated with the key derivation function and a base derivation key identifier associated with the base derivation key, wherein the key derivation function identifier, the base derivation key identifier, and the value are used to regenerate the key.

10. The system of claim 8, wherein a second key generation identifier comprises a key derivation function identifier associated with the key derivation function and a base derivation key identifier associated with the base derivation key, wherein the key derivation function identifier, the base derivation key identifier, and the value are used to regenerate a second key.

11. The system of claim 8, wherein generating the key, wherein the key is a first key, further comprises:
    determine a random character string; and
    generate the first key using the random character string; and
    wherein generating a second key further comprises:
    determine a second random character string; and
    generate the second key using the second random character string.

12. The system of claim 11, wherein the key generation identifier comprises the random character string, and wherein a second key generation identifier comprises the second random character string.

13. The system of claim 8, wherein the message is stored in the repository.

14. The system of claim 8, wherein the message is digitally signed with a private key to generate a digitally signed message, wherein authenticity and data integrity of the message can be determined based on each of the digitally signed value identifier associated with the value, the key generation identifier associated with the generation of a second key, and a public key of a public/private key pair comprising the private key.

15. A method, comprising:
    identifying, by a computing system, a message associated with a token, the token corresponding to output of a tokenization algorithm receiving as input a value and a key, the message comprising a key generation identifier associated with the key and a value identifier, the value identifier associated with the value;

retrieving, by the computing system, the key associated with a key identifier;

detokenizing, by the computing system, the token using the key to retrieve the value;

comparing, by the computing system, the retrieved value with the value associated with the with the value identifier.

16. The method of claim 15, wherein the key generation identifier comprises a key derivation function identifier associated with a key derivation function and a base derivation key identifier associated with a base derivation key.

17. The method of claim 16, wherein retrieving the key associated with the key identifier further comprises:

determining, by the computing system, the base derivation key and the key derivation function; and generating, by the computing system, the key using the base derivation key, the value, and the key derivation function.

18. The method of claim 15, wherein the key generation identifier comprises a random character string, wherein the key is the random character string, and wherein inputting the key and the value comprises combining the random character string with the value.

19. The method of claim 15, wherein the message is digitally signed with a private key to generate a digitally signed message, wherein authenticity and data integrity of the message can be determined based on each of the digitally signed value identifier associated with the value, the key generation identifier associated with the generation of the key, and a public key of a public/private key pair comprising the private key.

20. A non-transitory computer readable media having computer-executable instructions embodied therein that, when executed by a computing system, causes the computing system to perform operations comprising:

generating, via a key derivation function receiving as input a value and a base derivation key;

tokenizing, via a tokenization receiving as input the value and the key, the key into a token; and generating a message comprising a value identifier associated with the value and a key generation identifier associated with the generation of the key.

* * * * *